US008185425B2

(12) United States Patent  (10) Patent No.: US 8,185,425 B2
Lee et al.  (45) Date of Patent: May 22, 2012

(54) DATES LOCATOR

(75) Inventors: Chinhao David Lee, Mountain View, CA (US); Arup Kanjilal, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1384 days.

(21) Appl. No.: 11/550,363

(22) Filed: Oct. 17, 2006

(65) Prior Publication Data

US 2008/0091495 A1  Apr. 17, 2008

(51) Int. Cl.
*G06Q 10/00* (2012.01)
(52) U.S. Cl. ...................................................... 705/7.19
(58) Field of Classification Search .................... 705/80, 705/7.19
See application file for complete search history.

(56) References Cited

U.S. PATENT DOCUMENTS

| 5,873,108 | A  | * | 2/1999 | Goyal et al. | 715/203 |
| 7,577,963 | B2 | * | 8/2009 | O'Farrell et al. | 719/318 |
| 2002/0032733 | A1 | * | 3/2002 | Howard | 709/204 |
| 2002/0156787 | A1 | * | 10/2002 | Jameson et al. | 707/10 |
| 2005/0105374 | A1 | * | 5/2005 | Finke-Anlauff et al. | 365/232 |

OTHER PUBLICATIONS

What is the Live Words feature? Yahoo! Messenger, http://web.archive.org/web/20060819200320/http://help.yahoo.com/1/us/yahoo/messenger, printed Mar. 24, 2008. 2 pages.
Day Planner—Yahoo! Widgets, http://widgets.yahoo.com/widgets/day-planner, printed Apr. 2, 2008, 5 pages.
What is Day Planner? http://help.yahoo.com/1/us/yahoo/widget/planner/dayplanner/dayplanner-01.html, printed Apr. 2, 2008, 1 page.
Day Planner—Yahoo! Widgets, http://widgets.yahoo.com/widgets/day-planner/with/history, printed Apr. 2, 2008, 3 pages.
One Box Entry, http://30boxes.com/help.php?tab=addingEvents, printed Apr. 2, 2008, 2 pages.
30 Boxes—Wikipedia, http://en.wikipedia.org/wiki/30_Boxes, printed Apr. 2, 2008, 2 pages.
Google Calendar, https://www.google.com/accounts/ServiceLogin?service_cl&passive-true&nui+l&continu..., printed Apr. 2, 2008, 1 page.
Google Calendar, Wikipedia, http://en.wikipedia.org/wiki/Google_Calendar, printed Apr. 2, 2008, 4 pages.

* cited by examiner

*Primary Examiner* — Thomas Dixon
*Assistant Examiner* — Nancy Mehta
(74) *Attorney, Agent, or Firm* — Weaver Austin Villeneuve & Sampson LLP (57) ABSTRACT

Disclosed are apparatus and methods for locating one or more dates. Specific embodiments include a dates locator that is operable to analyze a date request in the form of natural language words or phrases and determine that such words or phrases correspond to a specific date or range of dates. In one natural language example, a date request may be in the form of a specified holiday or specified period of time before and/or after such specified holiday (e.g., Thanksgiving week) and the corresponding date or range of dates are retrieved by the dates locator. That is, dates locator embodiments receive a date request that uses date contextual information as input to thereby retrieve a specific date or range of dates. The retrieved date or range of dates may then be displayed based in the date request's contextual information. Additionally, a dates locator may include a learning mechanism to learn new associations between particular contextual information and a specific date or range of dates.

33 Claims, 7 Drawing Sheets

DATES LOCATOR

BACKGROUND OF THE INVENTION

The present invention relates generally to computer implemented calendar applications or "soft" calendar applications. More particularly, it relates to searching for specific dates or date ranges in such calendar applications.

As people schedule their daily activities, they may need to access a specific day, range of days, or time period in a calendar application. For example, a person may wish to check for availability for a meeting, dinner, vacation, or other types of activities/gathering set on a specific day(s) in the future, check for the earliest availability for an event/activity, plan for events/activities around a specific timeframe (i.e. holidays), check for a day of the week based on a date (e.g., what day of the week is September $22^{nd}$?) and vice versa, or quickly look up previously entered information.

Current calendar applications provide browse-based methods for finding specific dates or range of dates. That is, people must browse through calendars, typically by scrolling through sequential months or weeks, since this is the currently provided method. However, this type of scrolling feature to find a date or range of dates is very limited. For example, a person cannot find a set of dates based on what those dates signify in that person's life. For example, December $25^{th}$ is known commonly as Christmas, and a person cannot find a "Christmas" date.

By browsing, people cannot go to a date quickly (unless the date is within the immediate view). Users look up or navigate to the desired dates by browsing through the calendar, sometimes having to click several times back and forth through time. Needless to say, this process can be quite time consuming for the calendar user.

Accordingly, improved mechanisms for locating a date or range of dates in a calendar system or the like would be beneficial.

SUMMARY OF THE INVENTION

Accordingly, apparatus and methods for locating one or more dates are disclosed. Specific embodiments include a dates locator that is operable to analyze a date request in the form of natural language words or phrases and determine that such words or phrases correspond to a specific date or range of dates. In one natural language example, a date request may be in the form of a specified holiday or specified period of time before and/or after such specified holiday (e.g., Thanksgiving week) and the corresponding date or range of dates are retrieved by the dates locator. That is, dates locator embodiments receive a date request that uses date contextual information as input to thereby retrieve a specific date or range of dates. The retrieved date or range of dates may then be displayed based in the date request's contextual information.

In one set of embodiments, a method of automatically locating one or more dates is disclosed. A date request that includes contextual date information related to a specific date or a specific range of dates is received. The contextual date information does not have a predefined format. A specific date or a specific range of dates is automatically located based on the contextual date information of the date request. The located specific date or the located specific range of dates is automatically displayed.

In a specific implementation, the contextual date information of the date request includes one or more word(s) arranged in a natural language. In a further aspect, the contextual date information specifies a holiday. In yet a further aspect, the contextual date information specifies a time duration associated with the specified holiday, wherein the time duration is a week, a weekend, a month, or a day. In another embodiment, the contextual date information further includes one or more current settings of a calendar system, a time zone, or the current date. In a further aspect of this embodiment, the one or more current settings include a currently displayed day, a currently displayed month, or a currently displayed year of the calendar system.

In another embodiment, automatically locating a specific date or a specific range of dates is accomplished by (i) automatically locating one or more specific dates and any one or more quantifiers that are specified as related to the contextual date information of the date request, and (ii) if one or more quantifiers have been located, applying the one or more quantifiers to the one or more specific dates to form a specific date range. In yet another embodiment, a modification to the located specific date or the located specific date range is received, and the modification is learned so that receiving a next contextual date information, which is similar or the same as the currently received contextual date information, will result in locating and displaying the modification to the specific date or the specific date range.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

A dates locator embodiment may include mechanisms for analyzing a date request that includes contextual date information which does not directly specify a particular date or range of dates. Such a dates locator analyzes the date request to locate the date or range of dates that is related to such contextual information. The located date or date range may then be displayed. A dates locator system may take any suitable form. For example, the dates locator may be a stand-alone system or integrated within a particular application that utilizes dates, such as a software calendar system or stand-alone dates locator program. In a stand-alone example, the dates locator may be made available on any suitable operating system. The dates locator can be configured to communicate with any calendar system.

Figure 1:
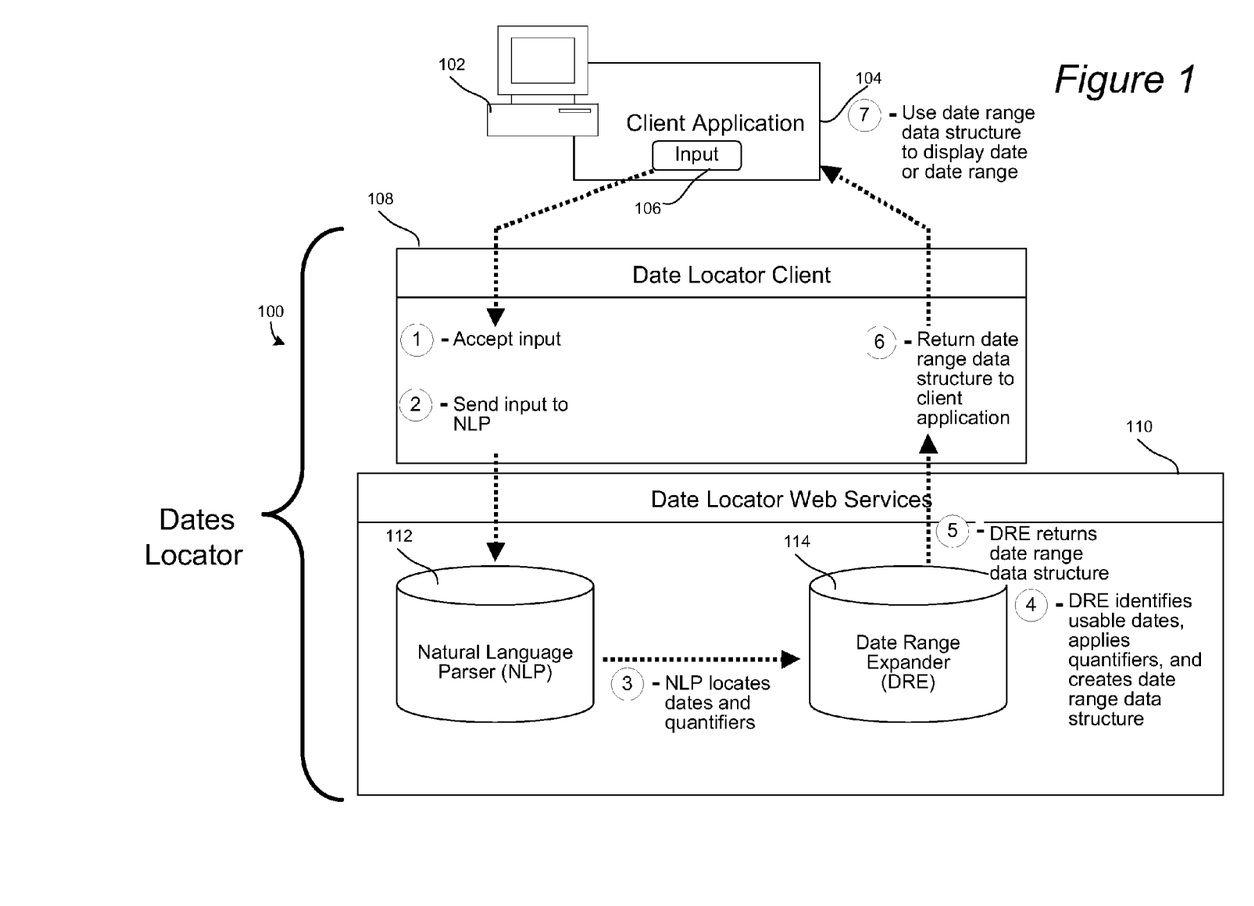
FIG. 1 illustrates a dates locator system in accordance with one embodiment of the present invention.

In one implementation, a dates locator is formed from one or more web services which can be adapted to any user interface technology and data source. FIG. 1 illustrates a dates locator system 100 in accordance with one embodiment of the present invention. As shown, the dates locator 100 includes a dates locator client 108 for communicating with a client application 104. The client application 104 is any application that may utilize a dates locator feature, such as a calendar application. The client application 104 may be configured on any suitable device, such as a computer system 102. Example device embodiments for implementing a client application and/or dates locator are further described below with reference to FIGS. 6 and 7.

The dates locator 100 also includes one or more dates locator services 110 for implementing date location operations. In this embodiment, the dates locator services 110 includes a natural language parser (NLP) 112 and a date range expander (DRE) 114. According to some embodiments, the DRE may be implemented as an extension to the NLP. Alternatively, the DRE may be implemented as a stand-alone web service or system service so as to de-couple the systems. Although the dates locator operations are shown as being implemented by two entities referred to as an NLP and DRE, of course, the techniques of the present invention may be implemented by any suitable number of and type of entities.

In operation (1), the date locator client 108 accepts or receives input 106 from the client application 104, e.g., a calendar application. The date locator client 108 may then send this input 106 to the NLP in operation (2). The NLP is configured to receive and analyze input in the form of words or phrases that provide contextual date information. The format of the input is flexible. That is, a user of the client application does not have to follow a predefined input format or syntax. Instead, the input may use a natural language syntax that corresponds to a date or range of dates. For example, the input may specify a word or phrase that represents a specific date or date range without directly or explicitly specifying the date or date range. By way of example, the input may specify a particular holiday by name (e.g., Thanksgiving, Christmas, Halloween, etc.) that corresponds to a particular date (e.g., November $23^{th}$, December $25^{th}$, October $31^{st}$, etc.). In addition to contextual information, the input may specify one or more components of a date, such as a month, or day of the week (e.g., Monday). The input may include various other date representations, such as the $1^{st}$ Monday of May or an actual specified date (e.g., May 11, 2006).

The input may also specify one or more quantifiers to be applied to the representative date or date range. For instance, the input may specify a period of time by a word or phrase (e.g., week, month, day, weekend, before, prior, subsequent, after, etc.) or one or more symbols (e.g., "-", "<-->", "<", ">", etc.) to indicate a range quantifier.

The input may include additional words that may not directly correspond to a particular date, date range, or date quantifier. For example, the input may be in the form of a question, such as "what day of the week is September $12^{th}$." In this example, September $12^{th}$ can be identified as a date and the word "day" as a quantifier for this date, while the remaining words correspond to other types of contextual information.

A user may enter all of the input words or phrases as contextual information or some of the contextual information may be supplied by the user's interactions with the client application or from some other external contextual information source, such as the actual current date or time zone. For example, a user may simply enter a month and a day component of a date without specifying the year component. The year component of the input may be inferred from the user's currently displayed calendar year or from the actual current year. For instance, if the user is viewing a day in 2006 or the current year is 2006, the input inferentially may include a 2006 year component. Other contextual information may used as input to the NLP and/or DRE to thereby more accurately determine the date or range of dates that the user wishes to retrieve or display. By way of another example, if the user simply specifies "next holiday", the user's currently displayed date may be input as contextual information to the NLP so as to facilitate determination of the meaning of the input phrase "next holiday."

In operation (3), the NLP may analyze an input to then locate at least one calendar date that corresponds to at least part of the input and locate one or more quantifiers that may correspond to at least part of the input. Location of a calendar date and/or quantifier may be accomplished by any suitable manner. For instance, the NLP may search through a date database that links specific input words and phrases to specific dates. For instance, specific holidays may be associated with particular dates. The associations between the input terms and specific dates may also be linked to user context. For example, specific date representations may be linked to particular calendar dates, such as "$1^{st}$ Monday of this month," "last week of the month," etc. when other factors, such as the currently displayed month in the client application, are considered. According to another example, a holiday input reference to Independence Day may be linked to various dates, depending on the user's country. Likewise, a quantifier database may link various input terms or symbols with particular date ranges or additional date components, such as week (Christmas week), a number ($1^{st}$ Monday of September), weekend (Labor day weekend), or the symbol "-" (Oct. 28, 2006-Oct. 31, 2006). These are just a few examples of possible quantifiers.

After the NLP has located one or more date(s) and possibly one or more quantifiers, the located date may be used to form a date data structure. For instance, the data structure may include a series of derived dates that are each associated with one or more quantifiers. The dates may also be sequentially arranged, e.g., with a beginning date followed by one or more subsequent dates and then an ending date, so as to facilitate determination of a date range. However, formation of a date data structure is optional and the NLP may merely compile a list of dates and quantifiers for use by the DRE as described below.

The DRE receives the one or more dates and quantifiers located by the NLP. The DRE may then analyze these one or more dates and quantifiers to identify usable dates, apply quantifiers, and create a date range data structure in operation (4). The DRE can receive structured data derived by the NLP and attempt to define a starting date and an ending date for a date range. It may use any suitable calendaring logic to form a date range. In a specific implementation, the DRE may identify and validate a starting date based on one or more of the located dates and quantifiers from the NLP. In a specific example, the structured data from the NLP may define the first identifiable date component to be "September" and its range quantifier to be "week" with a further quantification of "$2^{nd}$". In this case, calendaring logic may be used to identify the date on which the $2^{nd}$ week of September begins. In one embodiment, other factors may be taken into account, such as existing holidays, time zones, currently viewed dates, etc. Validation may be required for particular date formats, e.g., 10/30/06 may not be valid if the calendar system's format is dd/mm/yy. Similar techniques may be used to identify and validate an ending date. If range quantifiers were not included in the structure data, the DRE would not attempt to establish an ending date. As a result of this process, the DRE may produce a starting date and possibly an ending date as a data structure.

The date range data structure may then be returned (e.g., by the DRE) from the DRE to the date locator client 108 in operation (5). The date range data structure is then returned (e.g., by the date locator client) from the date locator client 108 to the client application 104 in operation (6) after which the client application 104 may use such data structure to display a specific date or date range in operation (7). For instance, the day or days that correspond to the data structure are displayed visually. For example, if the data structure includes a single day, only a single day may be displayed. In contrast, if the data structure includes the seven days of a specific week, then all seven days of the specified week may be displayed at once in an expanded view.

In another aspect, the dates locator may operate to re-train or learn interpretations of range quantifiers or date representations based on user feedback. For instance, an input of "Memorial Day" without a quantifier "weekend" may result in a starting date being identified as the Memorial Day holiday and leave out an ending date. Thus, only the single day that corresponds to Memorial Day is displayed to the user. The user may then expand this view to include the entire weekend surrounding Memorial Day. This action by the user to change the date view to include a different range may be fed back to the DRE, which may thereafter associate the input "Memorial Day" and/or other input holidays with the weekend range quantifier. That is, the weekend range quantifier may be used as a default quantifier for the Memorial Day holiday or for all holidays.

When a dates locator is implemented as a set of web services, any parent application (e.g., calendar application) may push input to the service(s) and pull results from such service (s). This parent application can develop its own user interface to link and call the dates locator services. The parent application can also be a web based service (e.g., website) or a desktop client application.

Figure 2:
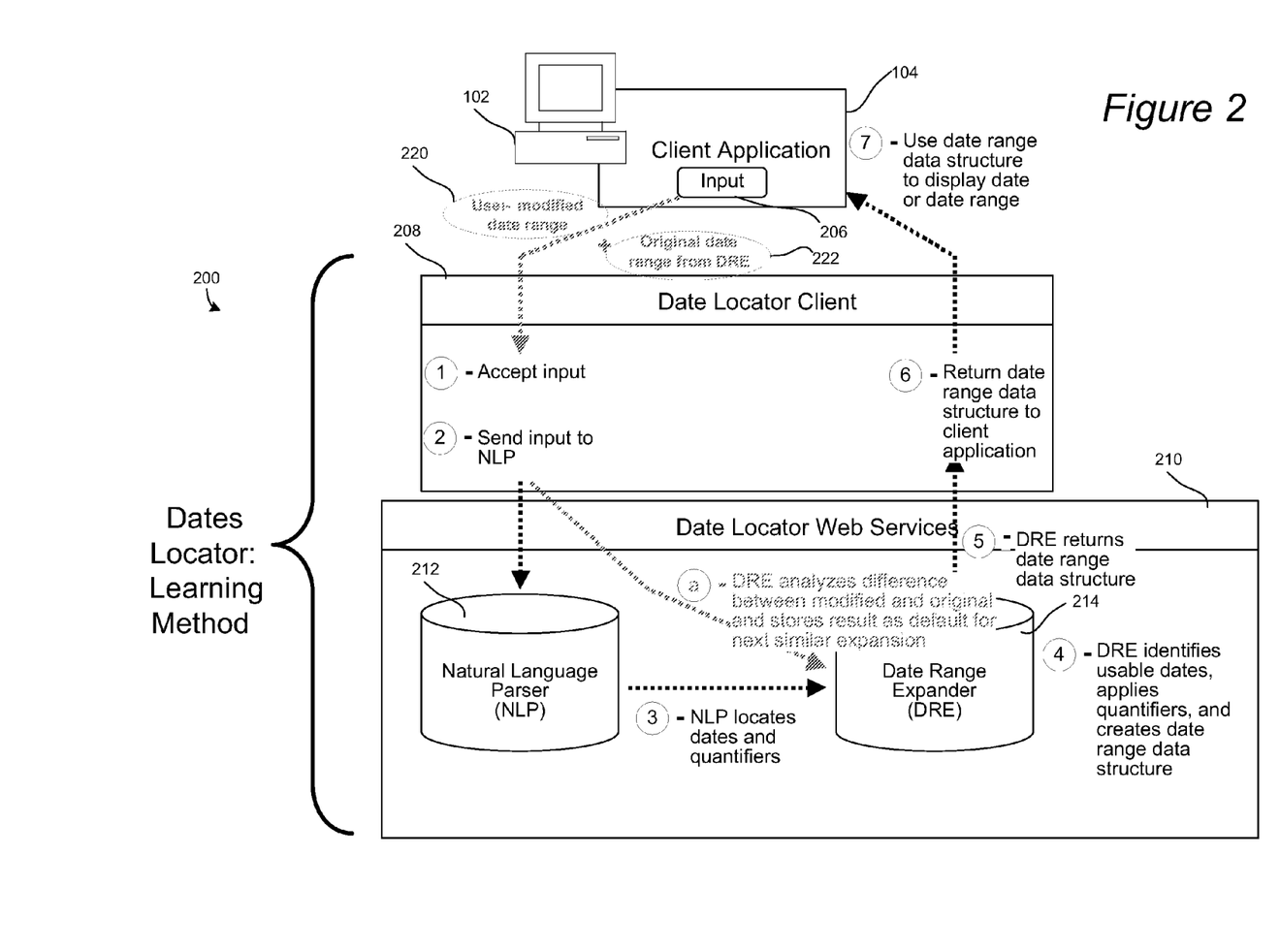
FIG. 2 illustrates an alternative implementation of a dates locator system having a learning feature.

FIG. 2 illustrates an alternative implementation of a dates locator system 200 having a learning feature. As shown, the dates locator 200 also includes a date locator client 208 and date locator web services 210 having an NLP 212 and DRE 214. These components may be configured to implement operations (1) through (6) as described above with respect to FIG. 1. However, when a user alters the results produced by the DRE, for example, this alteration is passed to the DRE (via the data locator and NLP) and the DRE will use this to learn new associations between user input and dates or date ranges. These new associates may be entered into the one or more databases used by the NLP and/or DRE.

As shown, a user-modified date range 220 is obtained from the client application 104. This user-modified date range 220 may also be associated with the original date range 222 produced by the DRE. The DRE can then analyze the difference between the modified date range 220 and the original date range 222 and store the result as a default for a next similar expansion in operation (a). That is, a user's modification to the displayed date range may be received by the DRE to serve as a default to a next similar date expansion. For example, if the user expands a single displayed date into a week of displayed dates for a holiday, the DRE may determine that a next input that specifies a holiday will be associated with a "week" quantifier when determining a date range for such holiday input, even when a range quantifier is not indicated by the user.

Figure 3:
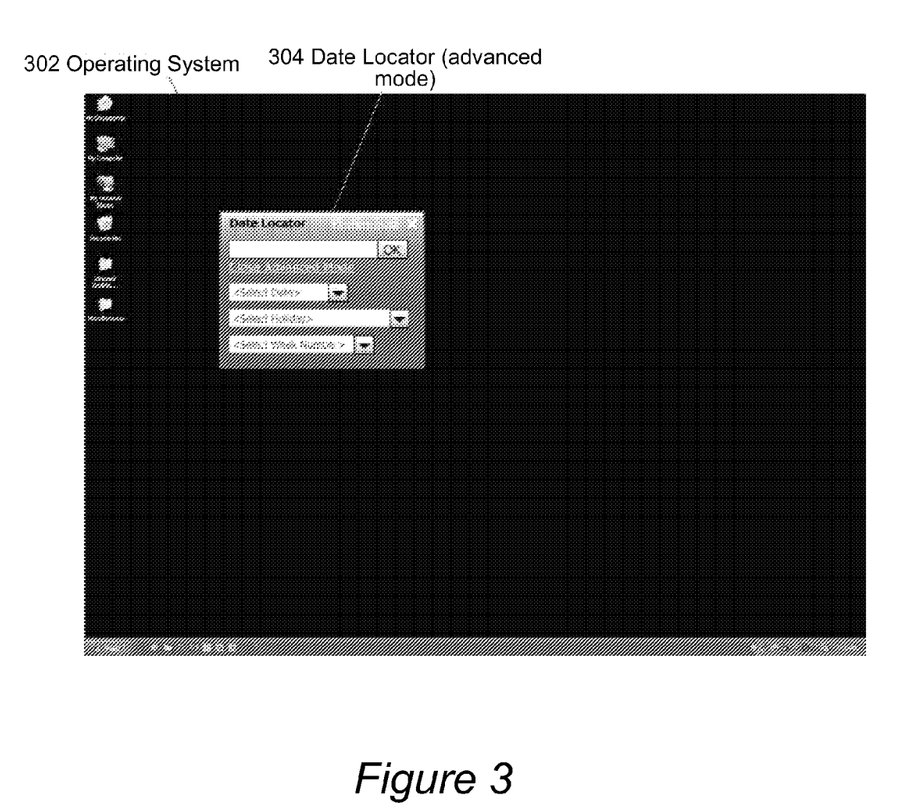
FIG. 3 is an example screen shot for entering input for a stand-alone dates locator system in accordance with a first embodiment of the present invention.

FIG. 3 is an example screen shot for entering input for a dates locator system in accordance with a first embodiment of the present invention. In this embodiment, a user interface for a dates locator 304 is implemented within operating system 302. In one implementation, the dates locator has two modes: a simple mode and an advanced mode (shown). In a simple mode, the user can enter one or more words or phrases that represent one or more dates. In the advanced mode, the user may select different predefined fields, such as a specific date, holiday, or week number, in addition to inputting one or more words or phrases that represent one or more dates. As shown, pull down menus are provided to select a specific date, holiday, and week number, while an input box is provided for inputting a natural language phrase.

Figure 4:
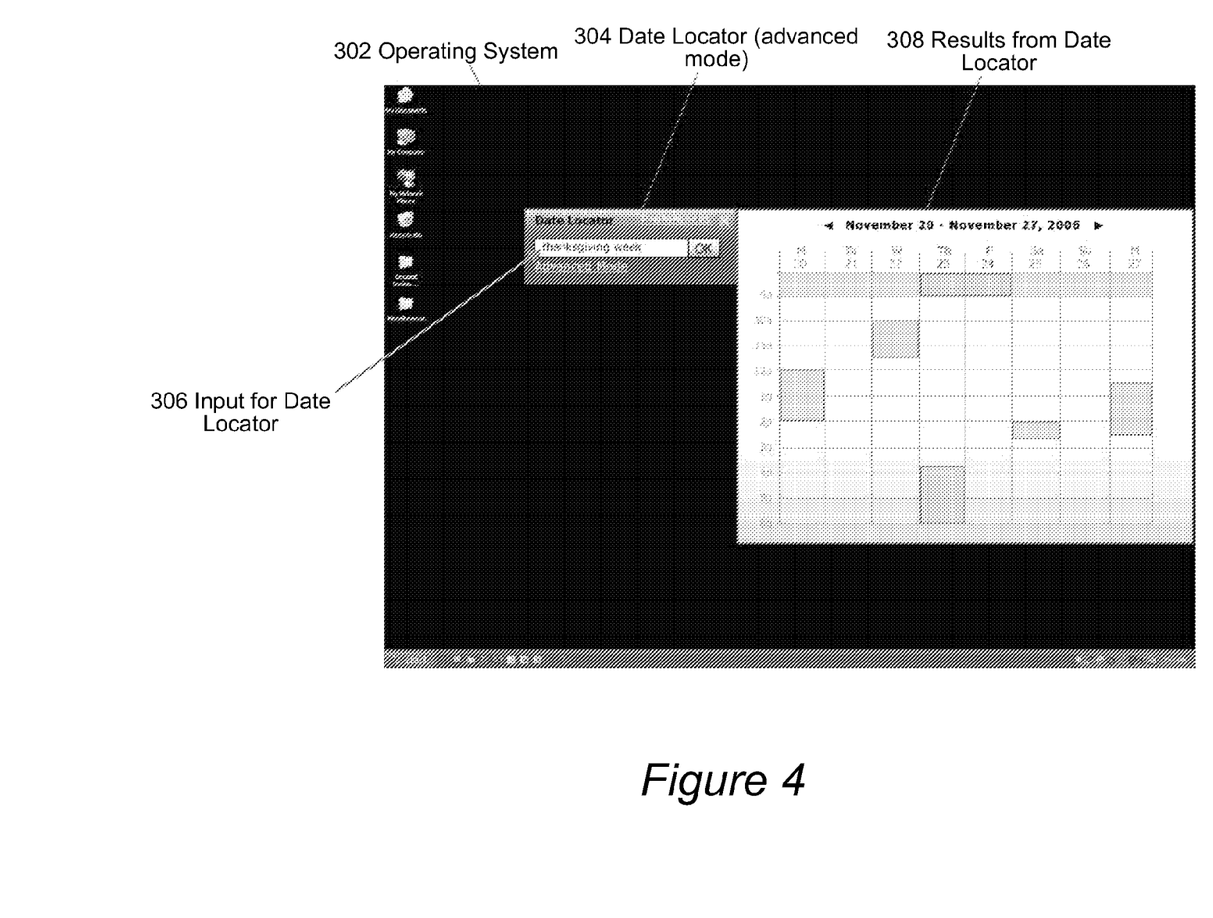
FIG. 4 is a screen shot of example results that are produced from a specific input entered into a stand-alone system.

A user may input a phrase or word and hit an execution button (as shown, "ok") or the "enter" key on the keyboard, and the date or date range found by the NLP and/or DRE are then displayed. The located date or date range is preferably displayed adjacent to the user input. FIG. 4 is a screen shot of example results that may be produced from a specific input entered into such a system. As shown, the input for the dates locator 306 specifies "Thanksgiving week" and the results from the dates locator 308 display the week of days surrounding the Thanksgiving holiday for the current year 2006.

Figure 5A:
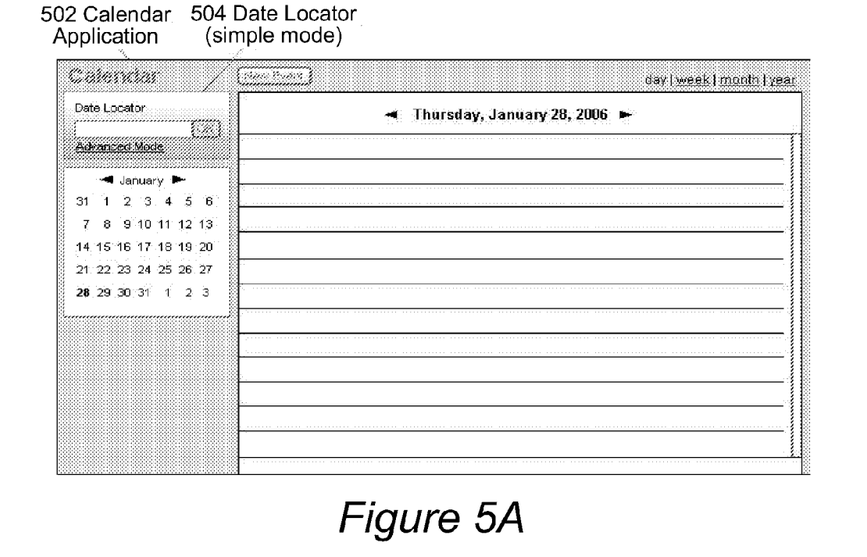
FIG. 5A is an example screen shot for entering input for a dates locator feature of a calendar system in accordance with a second embodiment of the present invention.

The dates locator may also form part of a calendar application to provide a quick mechanism for finding particular dates. The dates locator may be designed as part of the calendar interface and may use the calendar's database as a source for input analysis. FIG. 5A is an example screen shot for entering input for a dates locator feature of a calendar system in accordance with a second embodiment of the present invention. As shown, the calendar application 502 includes a dates locator (simple mode) 504 for entering one or more words that represent a date or date range. Alternatively, an advanced mode may be implemented (not shown).

Figure 5B:
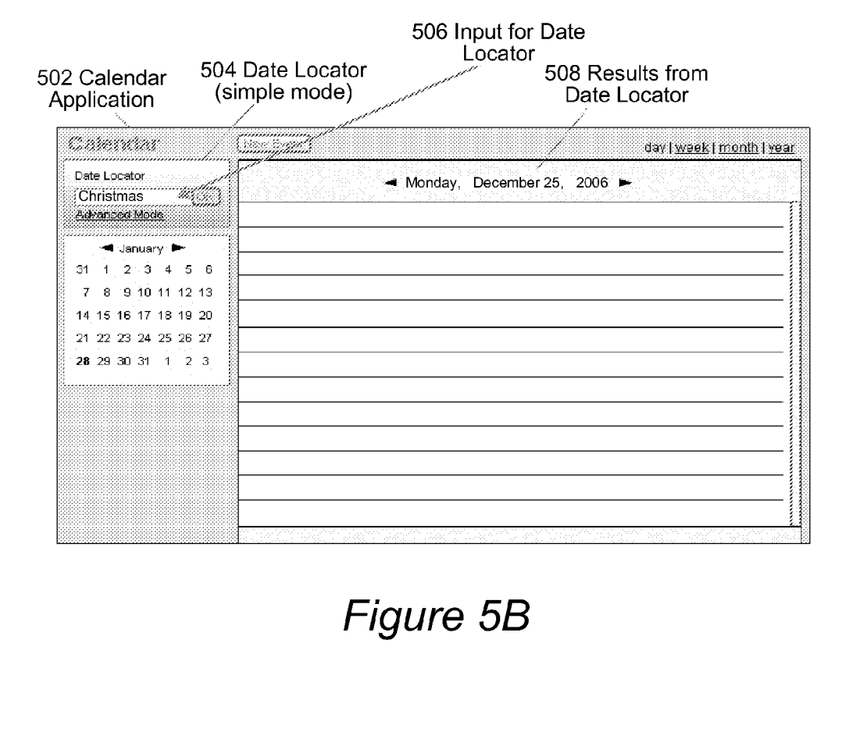
FIG. 5B is a screen shot of example results that are produced from a specific input entered into for a dates locator feature of a calendar system in accordance with a second embodiment of the present invention.

FIG. 5B is a screen shot of example results that are produced from a specific input entered into a dates locator feature of a calendar system in accordance with a second embodiment of the present invention. As shown, the input for the dates locator 506 has been entered as "Christmas", and in response, the dates locator displays the results 508 showing December 25$^{th}$ for the current year 2006, which is also shown as a Monday.

Various embodiments of a dates locator can offer one or more of several advantages. For instance, quick and easy access to a day or range of days can be provided based on common language terms, especially publicly known terms such as holidays. Additionally, the dates locator database is extensible to accommodate various important dates and common references to the same, such as publicly recognized cultural, social, and religious events. A dates locator provides an alternative to a user scrolling through an extensive number of days to reach a particular date by automatically jumping to a date or date range based on a user's natural language input. Also, results can be refined based on learning mechanisms that evaluate user input and interaction in certain embodiments.

Figure 6:
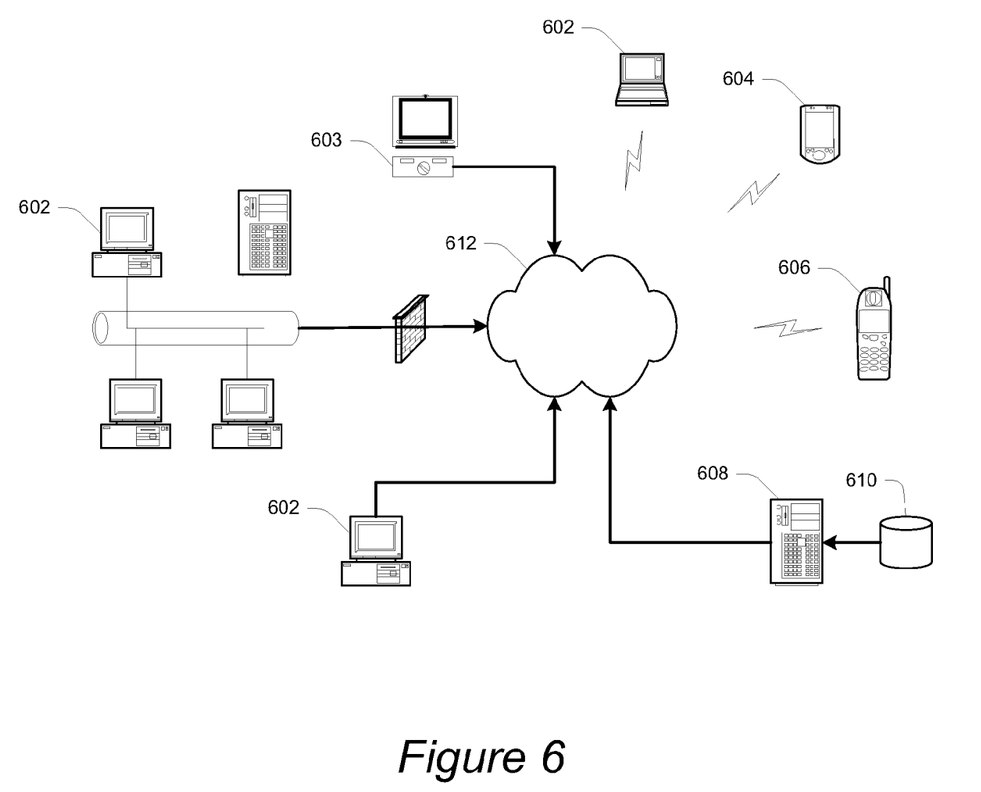
FIG. 6 is a simplified diagram of a network environment in which specific embodiments of the present invention may be implemented.

Embodiments of the present invention may be employed to utilize a dates locator in any of a wide variety of computing contexts. For example, as illustrated in FIG. 6, implementations are contemplated in which the relevant population of users interact with a diverse network environment via any type of computer (e.g., desktop, laptop, tablet, etc.) 602, media computing platforms 603 (e.g., cable and satellite set top boxes and digital video recorders), handheld computing devices (e.g., PDAs) 604, cell phones 606, or any other type of computing or communication platform.

And according to various embodiments, dates locator input that is processed in accordance with the invention may be obtained using a wide variety of techniques. For example, contextual date information may be obtained from a user's interaction with a local application, web site or web-based application or service and may be accomplished using any of a variety of well known mechanisms for obtaining information regarding a user's behavior. However, it should be understood that such methods of obtaining input for dates location are merely exemplary and that contextual date information may be collected in many other ways. For example, contextual date information may be collected when a user uploads date requests with, for example, a particular web site or service.

Once one or more contextual date information (and any relevant parameters) are obtained, dates location may be handled according to the invention in some centralized manner. This is represented in FIG. 6 by server 608 and data store 610 which, as will be understood, may correspond to multiple distributed devices and data stores. The invention may also be practiced in a wide variety of network environments (represented by network 612) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The dates locator techniques of the present invention may be implemented in any suitable combination of software and/or hardware system, such as a web-based server or desktop computer system. The dates locator apparatus of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store mappings between input words and contextual date information and specific dates and date ranges, user modifications to the results from the dates locator, default associations and modification to same, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as air, optical lines, electric lines, etc. Examples of program instructions include both machine code, such as produced by a compiler, and files containing higher level code that may be executed by the computer using an interpreter.

Figure 7:
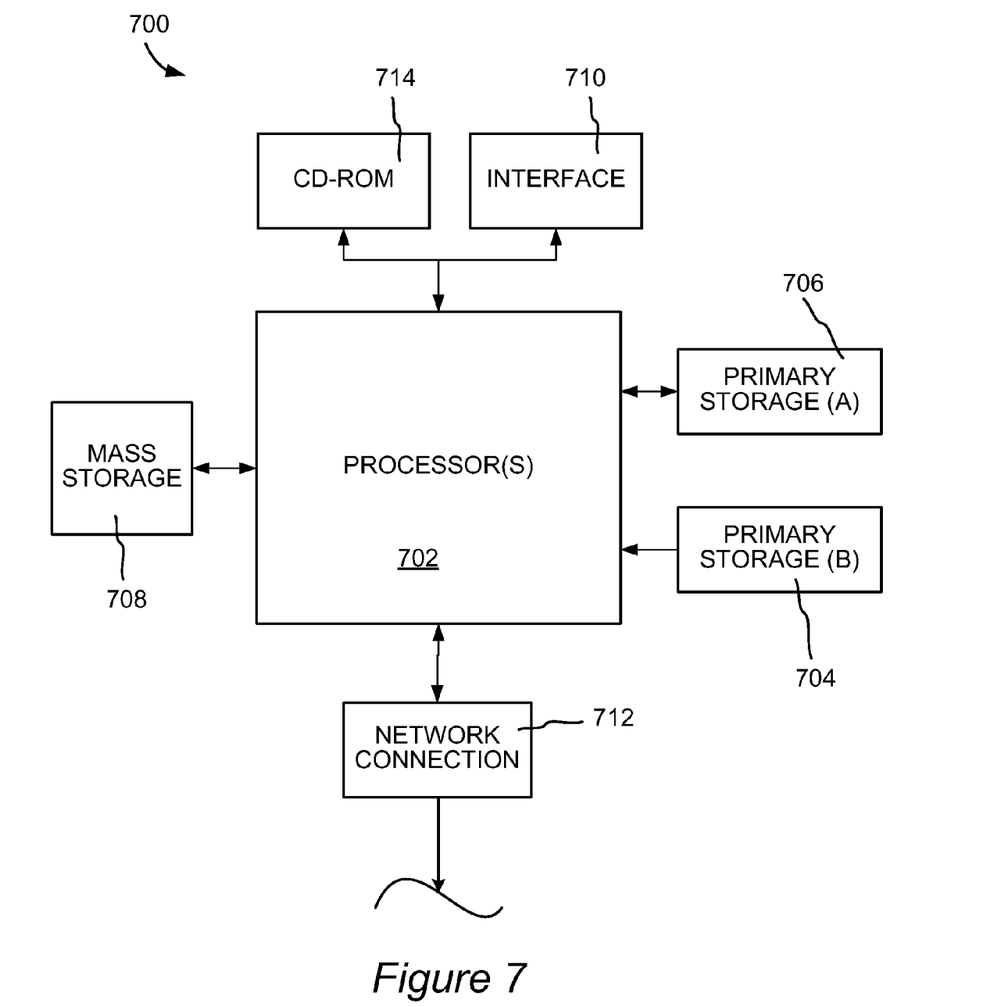
FIG. 7 illustrates an example computer system in which specific embodiments of the present invention may be implemented.

FIG. 7 illustrates a typical computer system that, when appropriately configured or designed, can serve as a dates locator system of this invention. The computer system 700 includes any number of processors 702 (also referred to as central processing units, or CPUs) that are coupled to storage devices including primary storage 706 (typically a random access memory, or RAM), primary storage 704 (typically a read only memory, or ROM). CPU 702 may be of various types including microcontrollers and microprocessors such as programmable devices (e.g., CPLDs and FPGAs) and unprogrammable devices such as gate array ASICs or general purpose microprocessors. As is well known in the art, primary storage 704 acts to transfer data and instructions uni-directionally to the CPU and primary storage 706 is used typically to transfer data and instructions in a bi-directional manner. Both of these primary storage devices may include any suitable computer-readable media such as those described above. A mass storage device 708 is also coupled bi-directionally to CPU 702 and provides additional data storage capacity and may include any of the computer-readable media described above. Mass storage device 708 may be used to store programs, data and the like and is typically a secondary storage medium such as a hard disk. It will be appreciated that the information retained within the mass storage device 708, may, in appropriate cases, be incorporated in standard fashion as part of primary storage 706 as virtual memory. A specific mass storage device such as a CD-ROM 714 may also pass data uni-directionally to the CPU.

CPU 702 is also coupled to an interface 710 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 702 optionally may be coupled to an external device such as a database or a computer or telecommunications network using an external connection as shown generally at 712. With such a connection, it is contemplated that the CPU might receive information from the network, or might output information to the network in the course of performing the method steps described herein.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method of automatically locating one or more dates in a computer implemented calendar application, comprising:
    receiving at a computing device a date request that includes contextual date information representative of a specific date or a specific range of dates wherein the contextual date information does not have a predefined format, and wherein said contextual date information includes input by a user that is related to and describes, but does not specify, a particular date or range of dates that allows said computer implemented calendar application to locate said particular date or range of dates;
    automatically locating by the computing device the specific date or the specific range of dates based on the contextual date information of the date request; and
    automatically initiating by the computing device the displaying of the specific date or the specific range of dates.

2. A method as recited in claim 1, wherein the contextual date information of the date request includes one or more word (s) represented in a natural language.

3. A method as recited in claim 2, wherein the contextual date information specifies a holiday.

4. A method as recited in claim 3, wherein the contextual date information specifies a time duration associated with the specified holiday, wherein the time duration is a week, a weekend, a month, or a day.

5. A method as recited in claim 2, wherein the contextual date information further includes one or more current settings of a calendar system, a time zone, or the current date.

6. A method as recited in claim 1, wherein the contextual date information includes a first date followed by a range indicator that is followed by a second date to thereby specify a date range that begins with the first date and ends with the second date.

7. A method as recited in claim 1, wherein automatically locating a specific date or a specific range of dates is accomplished by:
    automatically locating one or more specific dates and any one or more quantifiers that are specified as related to the contextual date information of the date request; and
    if one or more quantifiers have been located, applying the one or more quantifiers to the one or more specific dates to form a specific date range.

8. A method as recited in claim 1, further comprising:
    receiving a modification to the located specific date or the located specific date range; and
    learning the modification so that receiving a next contextual date information, which is similar or the same as the currently received contextual date information, will result in locating and displaying the modification to the specific date or the specific date range.

9. A method as recited in claim 1, wherein the displaying is initiated by one or more web service (s) that have performed the operation of automatically locating the specific date or range of dates and wherein the web service (s) initiate the displaying by sending the located specific date and range of dates to a client application that responds to the located specific date or date range by displaying such specific date or range of dates.

10. An apparatus comprising at least a processor and a memory, wherein the processor and memory are configured to perform the following operations:
    receiving a date request that includes contextual date information related to a specific date or a specific range of dates, wherein the contextual date information does not have a predefined format, and wherein said contextual date information includes input by a user that is related to and describes, but does not specify, a particular date or range of dates that allows said apparatus to locate said particular date or range of dates;
    automatically locating a specific date or a specific range of dates based on the contextual date information of the date request; and
    automatically initiate the displaying of the located specific date or the located specific range of dates.

11. An apparatus as recited in claim 10, wherein the contextual date information of the date request includes one or more word (s) arranged in a natural language.

12. An apparatus as recited in claim 11, wherein the contextual date information specifies a holiday.

13. An apparatus as recited in claim 12, wherein the contextual date information specifies a time duration associated with the specified holiday, wherein the time duration is a week, a weekend, a month, or a day.

14. An apparatus as recited in claim 11, wherein the contextual date information further includes one or more current settings of a calendar system, a time zone, or the current date.

15. An apparatus as recited in claim 10, wherein the contextual date information includes a first date followed by a range indicator that is followed by a second date to thereby specify a date range that begins with the first date and ends with the second date.

16. An apparatus as recited in claim 10, wherein automatically locating a specific date or a specific range of dates is accomplished by:
    automatically locating one or more specific dates and any one or more quantifiers that are specified as related to the contextual date information of the date request; and
    if one or more quantifiers have been located, applying the one or more quantifiers to the one or more specific dates to form a specific date range.

17. An apparatus as recited in claim 10, wherein the processor and memory are further configured to perform the following operations:
    receiving a modification to the located specific date or the located specific date range; and
    learning the modification so that receiving a next contextual date information, which is similar or the same as the currently received contextual date information, will result in locating and displaying the modification to the specific date or the specific date range.

18. At least one computer readable storage medium having computer program instructions stored thereon that are arranged to perform the following operations:
    receiving a date request that includes contextual date information related to a specific date or a specific range of dates, wherein the contextual date information does not have a predefined format, and wherein said contextual date information includes input by a user that is related to and describes, but does not specify, a particular date or range of dates that allows said computer program instructions to locate said particular date or range of dates;

automatically locating a specific date or a specific range of dates based on the contextual date information of the date request; and automatically initiating the displaying of the located specific date or the located specific range of dates.

19. A computer readable storage medium as recited in claim 18, wherein the contextual date information of the date request includes one or more word (s) arranged in a natural language.

20. A computer readable storage medium as recited in claim 19, wherein the contextual date information specifies a holiday.

21. A computer readable storage medium as recited in claim 20, wherein the contextual date information specifies a time duration associated with the specified holiday, wherein the time duration is a week, a weekend, a month, or a day.

22. A computer readable storage medium as recited in claim 19, wherein the contextual date information further includes one or more current settings of a calendar system, a time zone, or the current date.

23. A computer readable storage medium as recited in claim 18, wherein the contextual date information includes a first date followed by a range indicator that is followed by a second date to thereby specify a date range that begins with the first date and ends with the second date.

24. A computer readable storage medium as recited in claim 18, wherein automatically locating a specific date or a specific range of dates is accomplished by:

automatically locating one or more specific dates and any one or more quantifiers that are specified as related to the contextual date information of the date request; and if one or more quantifiers have been located, applying the one or more quantifiers to the one or more specific dates to form a specific date range.

25. A computer readable storage medium as recited in claim 18, wherein the computer program instructions are further arranged to perform the following operations:

receiving a modification to the located specific date or the located specific date range; and learning the modification so that receiving a next contextual date information, which is similar or the same as the currently received contextual date information, will result in locating and displaying the modification to the specific date or the specific date range.

26. A method as recited in claim 5, wherein the one or more current settings include a currently displayed day, a currently displayed month, or a currently displayed year of the calendar system.

27. A method as recited in claim 6, wherein the range indicator is a "-" or a "<-->" set of characters.

28. A method as recited in claim 1, wherein the located specific date or the located specific range of dates is only displayed without displaying other dates.

29. An apparatus as recited in claim 14, wherein the one or more current settings include a currently displayed day, a currently displayed month, or a currently displayed year of the calendar system.

30. An apparatus as recited in claim 10, wherein the located specific date or the located specific range of dates is only displayed without displaying other dates.

31. A computer readable storage medium as recited in claim 22, wherein the one or more current settings include a currently displayed day, a currently displayed month, or a currently displayed year of the calendar system.

32. A computer readable storage medium as recited in claim 23, wherein the range indicator is a "-" or a "<-->" set of characters.

33. A computer readable storage medium as recited in claim 18, wherein the located specific date or the located specific range of dates is only displayed without displaying other dates.

* * * * *